United States Patent
Perry et al.

(10) Patent No.: US 8,076,037 B2
(45) Date of Patent: Dec. 13, 2011

(54) HYDROGEN SENSOR CELL FOR DETECTING CONTAMINANTS

(75) Inventors: Michael Perry, Glastonbury, CT (US); Timothy Patterson, East Hartford, CT (US); Robert Mason Darling, South Windsor, CT (US)

(73) Assignee: UTC Power Corporation, South Windsor, CT (US)

( * ) Notice: Subject to any disclaimer, the term of this patent is extended or adjusted under 35 U.S.C. 154(b) by 835 days.

(21) Appl. No.: 12/159,091

(22) PCT Filed: Dec. 30, 2005

(86) PCT No.: PCT/US2005/047522
§ 371 (c)(1), (2), (4) Date: Jun. 25, 2008

(87) PCT Pub. No.: WO2007/078291
PCT Pub. Date: Jul. 12, 2007

(65) Prior Publication Data
US 2008/0299422 A1   Dec. 4, 2008

(51) Int. Cl.
*H01M 8/04* (2006.01)
(52) U.S. Cl. .......... 429/432; 429/400; 429/430
(58) Field of Classification Search .......... 429/13, 429/22, 400, 408, 411, 430, 431, 432
See application file for complete search history.

(56) References Cited

U.S. PATENT DOCUMENTS

| | | | |
|---|---|---|---|
| 4,755,439 A | 7/1988 | Trocciola et al. | |
| 6,280,865 B1 * | 8/2001 | Eisman et al. | 429/411 |
| 6,569,549 B1 | 5/2003 | Sawyer et al. | |
| 6,673,480 B1 | 1/2004 | Wilkinson et al. | |
| 2004/0005494 A1 | 1/2004 | Drake et al. | |
| 2004/0197621 A1 | 10/2004 | Balliet et al. | |

FOREIGN PATENT DOCUMENTS
EP   1017121   7/2000

OTHER PUBLICATIONS
Supplementary European Search Report for Application No. 05856002.0 dated Jun. 24, 2010.

* cited by examiner

*Primary Examiner* — David Vu
(74) *Attorney, Agent, or Firm* — Bachman & LaPointe, P.C.

(57) ABSTRACT

A fuel cell stack includes at least one fuel cell having a fuel inlet for directing a hydrogen fuel to the fuel cell to generate electric current; a sensor cell having an anode, a cathode and a membrane between the anode and the cathode, the anode being communicated with the fuel inlet to receive a portion of fuel from the fuel inlet, the sensor cell being connected across the stack to carry the electric current whereby hydrogen from the portion of fuel is electrochemically pumped to the cathode of the sensor cell; and a sensor communicated with the sensor cell to receive a signal corresponding to evolution of hydrogen from the anode to the cathode of the sensor cell and adapted to detect contaminants in the fuel based upon the signal.

17 Claims, 2 Drawing Sheets

HYDROGEN SENSOR CELL FOR DETECTING CONTAMINANTS

BACKGROUND OF THE INVENTION

The invention relates to fuel cells and, more particularly, to improving detection of contaminants entering the fuel cell through the reactant streams and their subsequent removal from the system.

Poor reactant and water quality can adversely affect the performance of fuel cells. Fuel can frequently carry contaminants which may poison the catalyst of the fuel cell. Such contaminants include carbon monoxide, sulfur dioxide, hydrogen sulfide and the like. Foreign cations in the water, which is used to cool and humidify the fuel cell, can deposit in the cell and interfere with its proper operation. Foreign cations may also be introduced to the cell via the reactant streams, e.g. sodium chloride in air Fortunately, fuel cells and especially PEM fuel cells have a demonstrated ability to recover from contamination. For example, catalyst poisons as discussed above can be removed, and catalyst activity recovered, by raising the anode potential to close to the air potential. This is accomplished in various methods including that which is disclosed in U.S. Pat. No. 6,841,278.

Foreign cations in the water can be removed through the water transfer plates, for example, by flushing the contaminated cells with clean water.

Although proper measures can be taken, nothing known in the art helps identify when such measures should be taken. Thus, such maintenance can to date only be done on a regularly scheduled basis, which clearly runs the risk of conducting such steps either when not needed or after performance of the fuel cell stack is already deteriorating, neither of which is desirable.

It is clear that the need exists for good indication as to when corrective or cleaning procedures based upon contaminants are needed.

It is therefore the primary object of the present invention to provide a system and method which identify when contaminants are present.

It is a further object of the invention to provide such identification in a system which is simple and reliable in practice, and which does not add significantly to the components or cost and/or weight of such components, of the fuel cell stack or power plant into which such measures are implemented.

Other objects and advantages of the present invention will appear below.

SUMMARY OF THE INVENTION

In accordance with the invention, the foregoing objects and advantages have been readily attained.

According to the invention, a fuel cell stack is provided which comprises at least one fuel cell having a fuel inlet for directing a hydrogen fuel to the fuel cell to generate electric current; a sensor cell having an anode, a cathode and a membrane between the anode and the cathode, the anode being communicated with the fuel inlet to receive a portion of fuel from the fuel inlet, the sensor cell being connected across the stack to carry the electric current whereby hydrogen from the portion of fuel is evolved to the cathode of the sensor cell; and a sensor communicated with the sensor cell to receive a signal corresponding to electrochemical pumping of hydrogen from the anode to the cathode of the sensor cell and adapted to detect contaminants in the fuel based upon the signal.

In further accordance with the invention, a method is provided for operating a fuel cell power plant, which method comprises operating a fuel cell stack comprising at least one fuel cell having a fuel inlet for directing a hydrogen fuel to the fuel cell to generate electric current, and a sensor cell having an anode, a cathode and a membrane between the anode and the cathode, the anode being communicated with the fuel inlet to receive a portion of fuel from the fuel inlet, the sensor cell being connected across the stack to carry the electric current whereby hydrogen from the portion of fuel is electrochemically pumped from the anode to the cathode of the sensor cell; and monitoring a parameter corresponding to electrochemical pumping of hydrogen from the anode to the cathode of the sensor cell to detect contaminants in the reactants based upon variation of the parameter.

BRIEF DESCRIPTION OF THE DRAWINGS

A detailed description of preferred embodiments of the present invention follows, with reference to the attached drawings, wherein.

DETAILED DESCRIPTION

The invention relates to detection of contaminants present in a fuel cell, especially to a PEM fuel cell.

Figure 1:
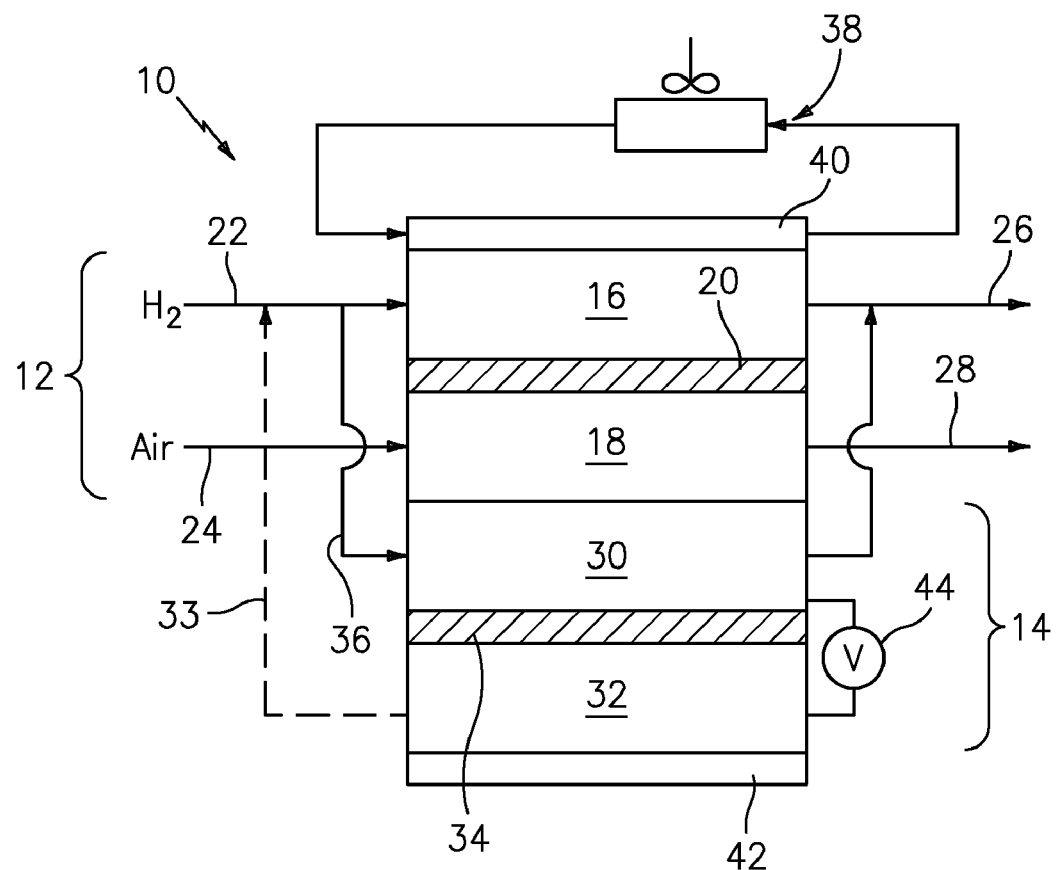
FIG. 1 schematically illustrates a system according to the invention.

FIG. 1 shows a fuel cell stack 10 which includes a plurality of fuel cells 12 (only one illustrated in FIG. 1) and a sensor cell 14. Fuel cells 12 have an anode flow field or anode 16 and a cathode flow field or cathode 18, and a membrane 20 disposed between them in well known manner. Hydrogen or a hydrogen-containing fuel is fed through a fuel inlet 22 to anode 16 of fuel cells 12 while oxidant is fed through an oxidant inlet 24 to cathode 18 of fuel cells 12, also in well known manner, to generate electricity across stack 10. Exhaust exits anode 16 through anode exhaust 26, while exhaust exits cathode 18 through cathode exhaust 28.

Sensor cell 14 also has an anode 30 and a cathode 32 as well as a membrane 34 positioned between anode 30 and cathode 32. Unlike fuel cells 12, sensor cell 14 is operated by feeding fuel only, and stack current passing through sensor cell 14 drives hydrogen across membrane 34 so that pure hydrogen is evolved at cathode 32. This operation of sensor cell 14 is sometimes referred to as operating as an electrochemical hydrogen pump.

Operation of sensor cell 14 as a hydrogen pump makes the cell far more sensitive to contaminants in the fuel cells, for example contaminants introduced via the reactant streams, and thus this cell can advantageously be used to detect such conditions, and to correct for them, at the proper time and without either unneeded shutdowns and/or impaired performance of the stack as happens with only regularly scheduled contaminant purging procedures.

According to the invention, sensor cell 14 receives fuel at anode 30 through a sensor fuel inlet 36 which is communicated with fuel inlet 22 of fuel cells 12. No oxidant is fed to cathode 32, and current and potential from the stack serves to drive hydrogen across membrane 34 as described above. Exhaust from anode 30, if any, can be fed to anode exhaust 26 of fuel cell 12. Exhaust from cathode 32 is substantially pure hydrogen, and can advantageously be further used in accordance with the invention. Thus, this exhaust is not merely vented, but can be recycled back to a fuel inlet as shown in FIG. 1. Alternatively, exhaust from cathode 32 can be fed through an exhaust line 33 back to fuel inlet 22 at a point downstream from the branch from fuel inlet 22 which feeds sensor cell 14. In this way, fuel used in sensor cell 14 is not wasted and is used in a manner which does not adversely affect the function of sensor cell 14. If this hydrogen were fed to the inlet feeding sensor cell 14, the pure hydrogen may mask potential contaminants and increase the hydrogen concentration in the fuel and reduce the ability of sensor cell 14 to detect same.

Still referring to FIG. 1, a water loop 38 can be provided for feeding water as coolant and humidifier to fuel cells 12 and, if desired, to sensor cell 14. This water can be fed to a water transport plate 40 as shown, which advantageously conveys water as needed to fuel cells 12. As shown, a water transport plate 42 can also be provided along sensor cell 14. This is less likely to be needed for cooling, but is useful for managing water content in the sensor cell 14. It should be noted that a water transport plate would also preferably be present between cells, and for example between cathode 18 and anode 30. Such additional water transport plates are not shown in the drawings for the purpose of simplicity.

In accordance with the invention, sensor cell 14 is advantageously more sensitive than the rest of stack 10 to deactivation due to catalyst poisons such as CO and Sulfur compounds which can be present in the fuel, and also to cation contamination from coolant water and the like. Thus, by monitoring a parameter related to rate of electrochemical pumping of hydrogen across membrane 34, sudden changes in such parameter can be indicative of the contaminants which are to be detected according to the invention.

For example, if fuel in fuel inlet 22 contains carbon monoxide, while this carbon monoxide will affect all cells 12, 14, it will affect cell 14 more significantly due to operation of cell 14 in a hydrogen pump mode. Deactivation of the catalyst in cell 14 will result in an increase in the potential difference across sensor cell 14, which will be a larger percentage of the sensor cell 14 potential than the potential of fuel cell 12 and this significant increase in potential difference is one parameter which can advantageously be monitored for change according to the invention. This catalyst activity loss will be relatively independent of the current density of the cells 12,14. The presence of cations in the membrane of the fuel cells 12, 14 will also cause an increase in potential difference across sensor cell 14 due to increased ohmic losses. However, since this change is related to changes which are proportional to current density, the class of contaminant can be determined by deliberately altering the stack current and watching the potential difference across sensor cell 14.

In order to measure the desired parameter, a sensor 44 can be provided for determining potential difference between the anode and cathode sides of sensor cell 14. FIG. 1 shows this as a simple voltage meter, but it should be appreciated that a wide variety of parameters can be measured, and a further wide variety of instruments can be used to make such measurements, well within the scope of the present invention.

In accordance with the invention, it is desired for sensor cell 14 to be as sensitive as possible so that contaminants can be detected well prior to any impact the contaminants can have on performance of the stack. In this regard, since the potential of the hydrogen sensor cell consists of just the polarization of the hydrogen reaction (both reduction and oxidation) and the resistance of the cell, and since these are very small relative to the cathode reaction (oxygen reduction reaction), the sensor cell is very sensitive to any change in either the hydrogen polarization or cell resistance. If a catalyst poison is present in the fuel, the potential of the sensor cell will increase due to increased activation polarization of the hydrogen reactions on the electrodes.

On the other hand, if foreign cations are accumulating in the system, for example from accumulation within the system faster than they are removed, the resistance of the cells will increase in an amount proportional to the current density. Since such losses will be a larger percentage of the voltage of the sensor cell than the voltage of the fuel cells, the sensor cell will be the most sensitive to these losses as desired.

Further, as set forth above, the type of contamination can be differentiated by how the increase in potential varies with current density.

Suitable steps to take in response to contamination can include checking of fuel, air and/or water quality, initiation of shutdowns, activation of recovery procedures such as raising of the potential of the anode to remove the catalyst poison, or changing of DI beds or fuel filters, and the like. Further, in systems having air bleed capability, an increase in air bleed can also be a suitable step.

It should also be noted that the signal measured from sensor cell 14 can also be used to determine whether the implemented remedial steps are having the desired effect.

Figure 2:
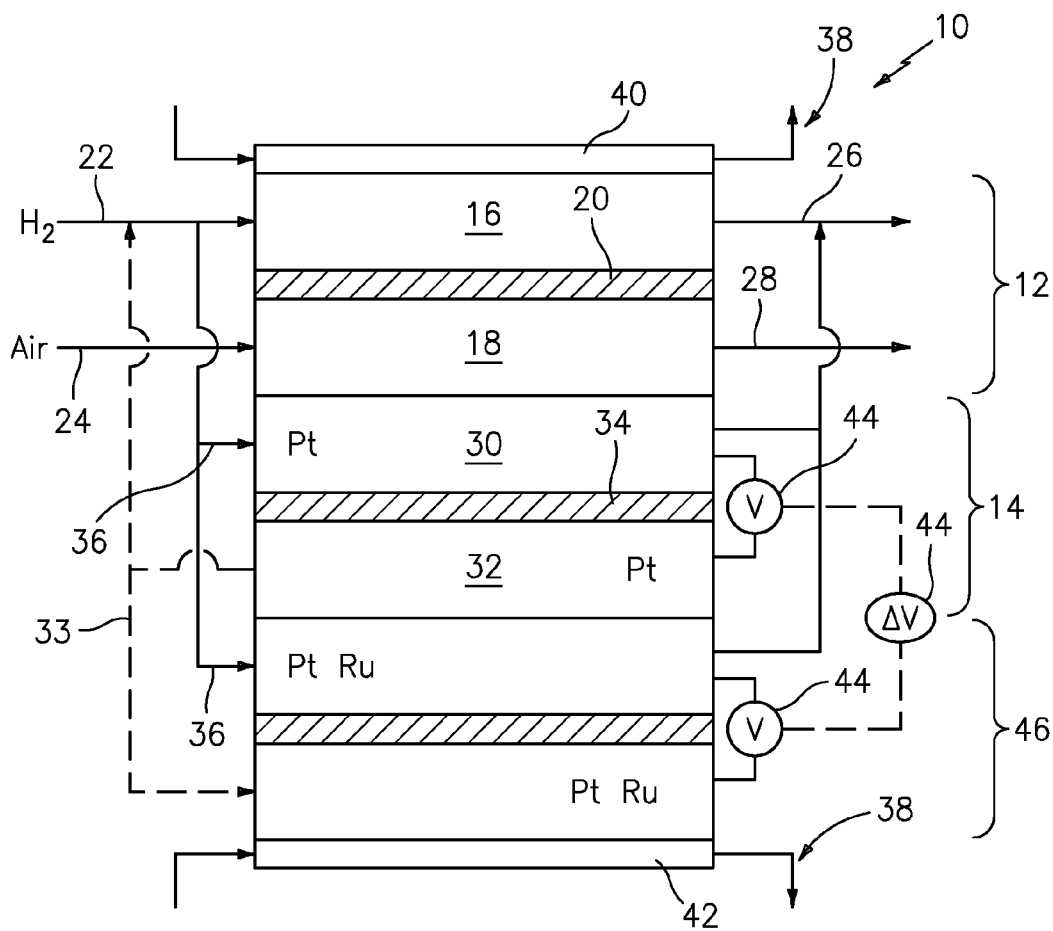
FIG. 2 illustrates an alternative embodiment utilizing two different sensor cells.

In accordance with one particular embodiment of the present invention, desirable results are obtained using two sensor cells. FIG. 2 shows a stack 10 according to the invention, with like numerals showing similar elements as FIG. 1. In this embodiment, however, two sensor cells 14, 46 are included, and these cells can provide even further information regarding contaminants.

According to the invention, sensor cell 14 and sensor cell 46 are provided having different catalysts, and these catalysts are selected preferably so that they react differently to contaminants. For example, platinum catalyst is particularly vulnerable to CO poisoning, while platinum/ruthenium catalyst is much less affected. According to the embodiment of FIG. 2, sensor cell 14 is provided using platinum catalyst on both electrodes, while sensor cell 46 is provided having PtRu catalyst on the anode electrode. Under normal circumstances, both sensor cells 14, 46 should read approximately the same difference in voltage.

However, if fuel contamination is present, for example as CO, the CO poisons the Pt catalyst much more severely than the PtRu catalyst, and the Pt anodes will polarize much more than the cell which has Ru on the anodes. Thus, monitoring the voltage difference between the two cells can provide excellent information as to contaminants in the fuel cells.

Figure 3:
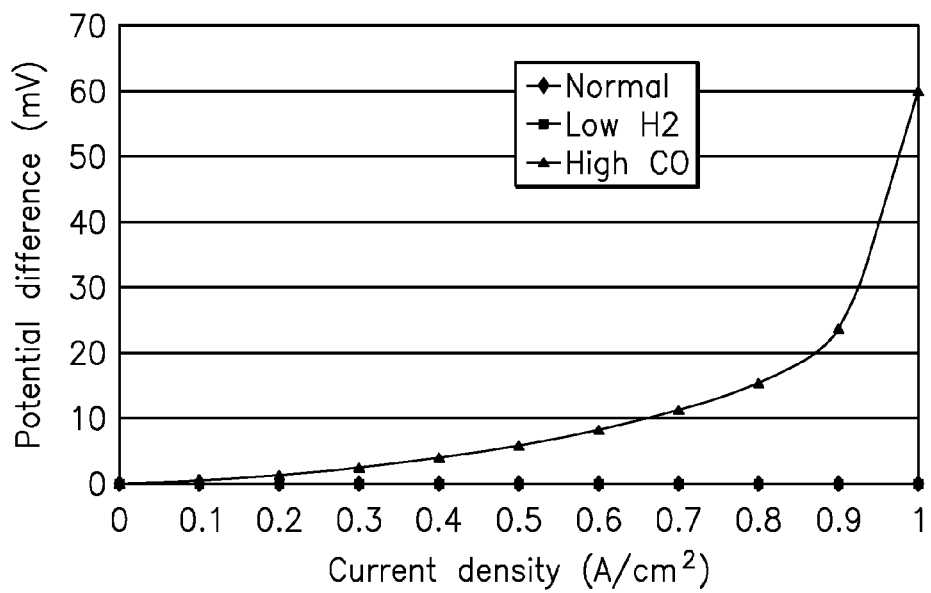
FIG. 3 illustrates potential difference vs. current density for normal, low hydrogen and high CO operation.

Referring to FIG. 3, measurements were made with a system having two different sensor cells as described above. The results shown in FIG. 3 are the potential difference between the two sensor cells as a function of current density for normal and high CO operation, as well as a low hydrogen situation.

In accordance with this embodiment of the invention, the anode electrode of sensor cell 46 is provided with CO tolerant catalyst, typically, PtRu catalyst. Other catalysts and catalyst combinations which would be useful with the present invention are disclosed in U.S. Pat. No. 5,183,713, incorporated herein in its entirety by reference.

As with the embodiment of FIG. 1, when sensors 14, 46 indicate that contaminant is present, appropriate remedial steps can advantageously be taken so as to avoid impact upon efficiency of operation of the stack, and further to avoid the need for scheduled maintenance which could result in unneeded steps being taken.

Figure 4:
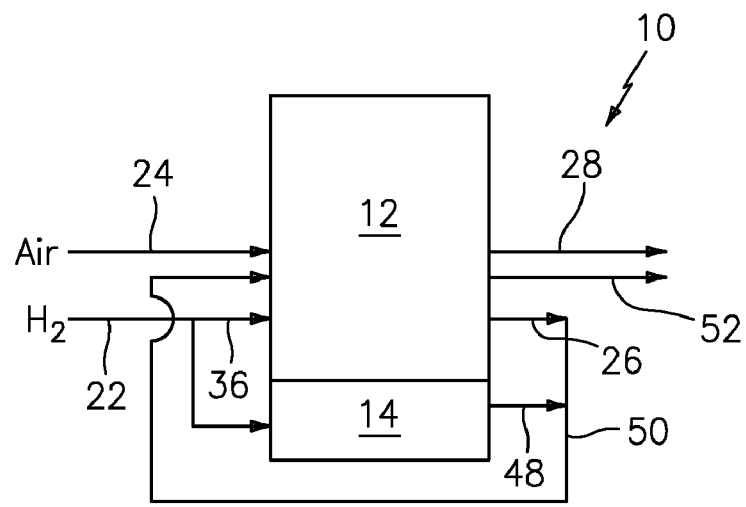
FIG. 4 illustrates a two-pass fuel flow system utilizing the contaminant detection according to the invention.

As set forth above, it is desired to make sensor cell 14 (and sensor cell 46 if included) as sensitive as possible so that warning can be given before any impact on efficiency takes place. In this regard, in a multiple pass fuel flow field design, the sensor cell can be integrated into the flow so that the sensor cell has one less pass than the other cells. FIG. 4 shows such a system, and schematically illustrates a stack 10 having a plurality of fuel cells 12 (not individually shown) and a sensor cell 14. Fuel is fed through a manifold from fuel inlet 22 to fuel cells 12 and sensor cell 14. As schematically shown, oxidant such as air is also fed to fuel cells 12. Cathode exhaust exits stack 10 through exhaust line 48, while anode exhaust passes to a fuel turn manifold (schematically illustrated at 50) for a further pass through fuel cells 12. According to the invention, the anode exhaust from sensor cell 14 is fed to turn manifold 50 so that the electrochemically pumped hydrogen is not wasted and is nevertheless not injected into the system in a location which interferes with proper operation of sensor 14. Anode exhaust from the second pass through fuel cells 12 exits stack 10 at exhaust line 52. This same type of setup can be implemented with stack configurations having 3 or more passes as well, and will result in the sensor cell always having one less pass than the other cells of the stack. This advantageously results in the sensor cell operating at a higher per pass fuel utilization than any other cell, which renders the cell most sensitive to detecting the contaminants discussed.

It should be appreciated that the system and method of the present invention advantageously provide for detection of fuel cell operation which requires attention well prior to adverse impact upon operation of the system overall.

While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

We claim:

1. A fuel cell stack, comprising:
   at least one fuel cell having a fuel inlet for directing a hydrogen fuel to the fuel cell to generate electric current;
   a sensor cell having an anode, a cathode and a membrane between the anode and the cathode, the anode being communicated with the fuel inlet to receive a portion of fuel from the fuel inlet, the sensor cell being connected across the stack to carry the electric current whereby hydrogen from the portion of fuel is evolved to the cathode of the sensor cell; and
   a sensor communicated with the sensor cell to receive a signal corresponding to electrochemical pumping of hydrogen from the anode to the cathode of the sensor cell and adapted to detect contaminants in the fuel cell based upon the signal.

2. The apparatus of claim 1, wherein the stack further comprises a cooling system for circulating coolant to the stack, and wherein the sensor is further adapted to detect contaminants in the electrodes and the membrane based upon the signal.

3. The apparatus of claim 1, wherein the sensor comprises a first sensor having a first catalyst and a second sensor having said first catalyst and a second catalyst which is less susceptible to contamination than the first catalyst.

4. The apparatus of claim 3, wherein the sensor compares signals from the first sensor and the second sensor to detect contaminants in the fuel cell.

5. The apparatus of claim 3, wherein the first catalyst is platinum and the second catalyst is platinum/ruthenium.

6. The apparatus of claim 1, wherein the sensor cell has an exhaust which is communicated back to the fuel inlet.

7. The apparatus of claim 1, wherein the cathode of the sensor cell is also communicated with the fuel inlet.

8. The apparatus of claim 1, wherein the at least one fuel cell comprises a plurality of fuel cells each having an anode and a cathode and a membrane positioned between the anode and the cathode, and wherein the anode of the sensor cell has a greater resistance to gas flow than anodes of the plurality of fuel cells.

9. The apparatus of claim 1, further comprising a control system communicated with the sensor and programmed to provide at least one of an alarm and instructions for corrective action upon detecting the presence of contaminants in the fuel.

10. A method for operating a fuel cell power plant, comprising:
    operating a fuel cell stack comprising at least one fuel cell having a fuel inlet for directing a hydrogen fuel to the fuel cell to generate electric current, and a sensor cell having an anode, a cathode and a membrane between the anode and the cathode, the anode being communicated with the fuel inlet to receive a portion of fuel from the fuel inlet, the sensor cell being connected across the stack to carry the electric current whereby hydrogen from the portion of fuel is electrochemically pumped to the cathode of the sensor cell; and
    monitoring a parameter corresponding to level of electrochemically pumped hydrogen from the anode to the cathode of the sensor cell to detect contaminants in the fuel cell based upon variation of the parameter.

11. The method of claim 10, wherein the stack further comprises a cooling system for circulating coolant to the stack, and wherein the monitoring step also detects contaminants in the electrodes and membrane based upon the parameter.

12. The method of claim 10, wherein the sensor cell comprises a first sensor cell having a first catalyst and a second sensor cell having the first catalyst and a second catalyst which is less susceptible to contamination than the first catalyst.

13. The method of claim 12, wherein the monitoring step further comprises comparing signals from the first sensor and the second sensor to detect contaminants in the fuel cell.

14. The method of claim 12, wherein the first catalyst is platinum and the second catalyst is platinum/ruthenium.

15. The method of claim 10, wherein the sensor cell has an exhaust which is communicated back to the fuel inlet.

16. The method of claim 10, wherein the at least one fuel cell comprises a plurality of fuel cells each having an anode and a cathode and a membrane positioned between the anode and the cathode, and wherein the anode of the sensor cell has a greater resistance to gas flow than anodes of the plurality of fuel cells.

17. The method of claim 10, further comprising a control system communicated with the sensor and programmed to provide at least one of an alarm and instructions for corrective action upon detecting the presence of contaminants in the fuel cell.

* * * * *